(12) United States Patent
Philar

(10) Patent No.: US 12,321,399 B2
(45) Date of Patent: Jun. 3, 2025

(54) SYSTEM AND METHOD FOR A WEB SCRAPING TOOL

(71) Applicant: Zyte Group Ltd., Ballincollig (IE)

(72) Inventor: Akshay Philar, Ballincollig (IE)

(73) Assignee: Zyte Group Ltd., Ballincollig (IE)

( * ) Notice: Subject to any disclaimer, the term of this patent is extended or adjusted under 35 U.S.C. 154(b) by 0 days.

(21) Appl. No.: 18/060,213

(22) Filed: Nov. 30, 2022

(65) Prior Publication Data

US 2024/0007537 A1    Jan. 4, 2024

Related U.S. Application Data

(60) Provisional application No. 63/357,065, filed on Jun. 30, 2022.

(51) Int. Cl.
*G06F 16/90*    (2019.01)
*G06F 16/951*   (2019.01)
*H04L 45/74*    (2022.01)

(52) U.S. Cl.
CPC .......... *G06F 16/951* (2019.01); *H04L 45/742* (2013.01)

(58) Field of Classification Search
CPC .............................. G06F 16/951; H04L 45/742
See application file for complete search history.

(56) References Cited

U.S. PATENT DOCUMENTS

| | | | |
|---|---|---|---|
| 8,976,955 B2* | 3/2015 | Liberman Ben-Ami | H04M 3/5191 379/265.09 |
| 9,736,214 B2* | 8/2017 | Mendez | G06Q 30/016 |
| 2008/0235143 A1* | 9/2008 | Beller | H04L 67/025 705/63 |
| 2009/0119172 A1* | 5/2009 | Soloff | G06Q 30/02 705/344 |
| 2011/0178906 A1* | 7/2011 | Joye | G06Q 40/00 705/35 |
| 2013/0041781 A1* | 2/2013 | Freydberg | G06Q 30/06 705/27.1 |
| 2013/0136253 A1* | 5/2013 | Liberman Ben-Ami | H04M 3/5191 379/265.09 |
| 2015/0149645 A1* | 5/2015 | Mendez | G06F 40/143 709/227 |
| 2016/0119365 A1* | 4/2016 | Barel | G06F 16/95 726/12 |
| 2017/0346851 A1* | 11/2017 | Drake | H04L 9/0838 |
| 2019/0066133 A1* | 2/2019 | Cotton | G06Q 30/0202 |
| 2020/0334585 A1* | 10/2020 | Petroulas | G06Q 10/04 |
| 2020/0412767 A1* | 12/2020 | Crabtree | H04L 63/1441 |
| 2021/0287147 A1* | 9/2021 | Mimassi | G06Q 10/10 |
| 2022/0100808 A1* | 3/2022 | Juravicius | G06F 16/951 |
| 2023/0100529 A1* | 3/2023 | Petroulas | H04L 47/827 705/4 |

FOREIGN PATENT DOCUMENTS

EP    3997590 A1 *    5/2022

* cited by examiner

*Primary Examiner* — Daniel A Kuddus
(74) *Attorney, Agent, or Firm* — Ruggiero McAllister & McMahon LLC

(57) ABSTRACT

A web scraping system configured with web scraping countermeasure resolution technology.

18 Claims, 9 Drawing Sheets

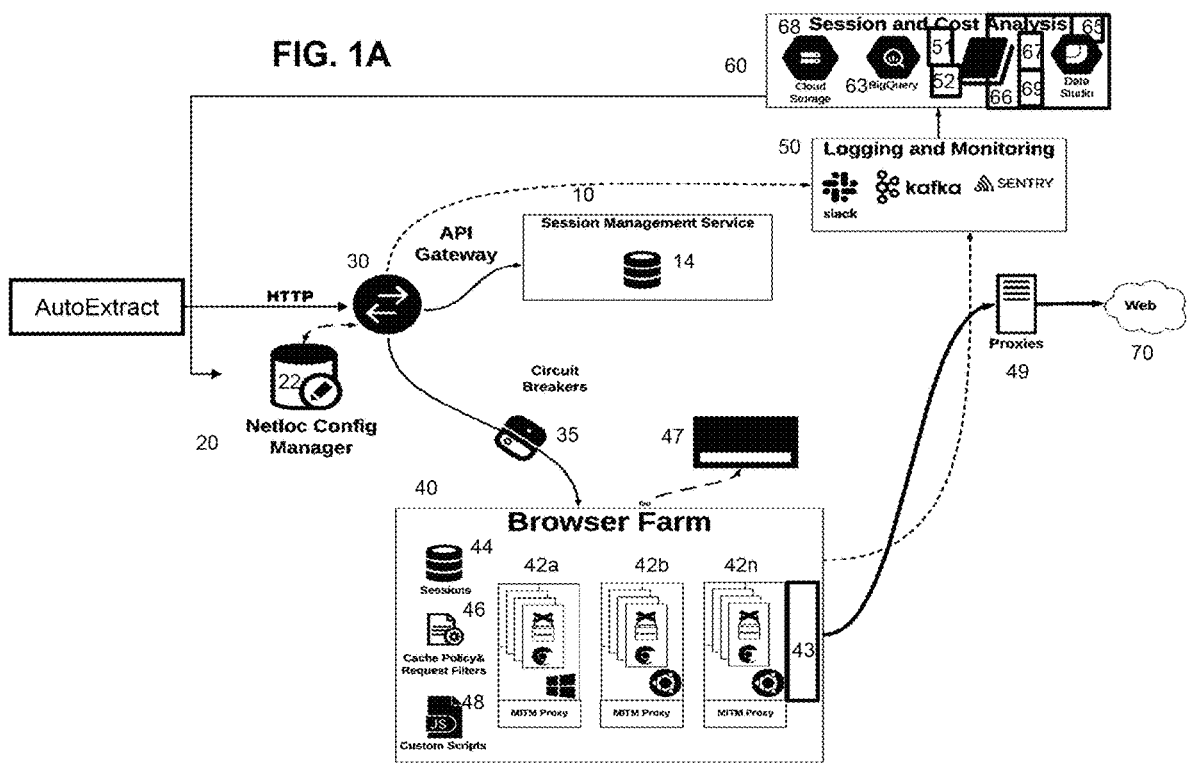

SYSTEM AND METHOD FOR A WEB SCRAPING TOOL

CROSS REFERENCE TO RELATED APPLICATION

This application is a non-provisional U.S. patent application and claims priority to U.S. provisional patent application 63/357,065 having the same title and filed on Jun. 30, 2022, the entirety of which is incorporated herein by reference.

DESCRIPTION OF THE RELATED TECHNOLOGY

Software that extracts structured information from the web automatically is conventionally handled by creating custom web scrapers for each website being accessed. Zyte Group Limited is a creator and maintainer of the most popular open-source framework for creating web scrapers (Scrapy).

Websites employ web scraping countermeasures to block web scraping. In response, web scrapers have employed web scraping countermeasure solutions to access websites. Web scraping countermeasure solutions such as user agent spoofing, proxy rotation, retry mechanisms, or headless browser-based approaches have been employed with varying degrees of success in the past. However, with the advent of sophisticated fingerprinting techniques, these approaches have been rendered ineffective. Such approaches include Passive Client Fingerprinting (TLS Fingerprinting, TCP/IP Fingerprinting, HTTP/2 Fingerprinting), Browser Fingerprinting (Canvas Fingerprinting, Font fingerprinting, WebGL, WebRTC) and human observable proofs and request pattern analysis (CAPTCHA, Gesture detection, and Tracking beacons).

FIG. 4 shows an example of a logical flow of a manual process to mitigate web scraping countermeasures. At block 404 a system developer module or tool, for example a browser extension or proxy with a configured browser, is used to determine if the website has web scraping countermeasures, for example, a CAPTCHA, a script challenge and/or a fingerprint challenge. At block 404 it is determined if the countermeasure is known and if a solution for the countermeasure exists, for example using a CAPTCHA solver. If so, at block 405, the solution is obtained to resolve the countermeasure challenge. At block 434, the developer can access the website content, for example, using a crawler.

If the web scraping countermeasure is not known, at block 406 the developer analyzes the underlying code (Javascript), and at block 408, determines if the countermeasure is a script challenge or a fingerprint challenge. If the countermeasure is a script challenge, at block 410 system tool runs a script solver.

If the developer determines that the web scraping countermeasure is a fingerprint challenge, at block 412 the developer needs to analyze the response, deobfuscate the code, and attempt to solve the challenge, for example by using a Javascript execution engine such as a Js2Py module. At block 414, the system determines if the solver has resolved the fingerprint challenge, and if so, block 416 generates a web scraping countermeasure script to be employed by a scraper and crawler 41. If the system solver does not resolve the fingerprint challenge, at block 418 the user can run a browser module to render the target website and then instructs the module to execute a browser. A browser module can comprise, for example, a lightweight web browser with an HTTP API. For example, the response analyzer can employ Splash, a lightweight browser with an HTTP API, implemented in Python 3 using Twisted, an event driven networking engine, and Qt 5 APIs.

If at block 406 the developer analyzes the challenge and determines the web scraping countermeasure is a script challenge, at block 430 system is configured to obtain a browser profile for the website from a configuration manager, disable cookies, and run a crawler under the browser profile. At block 432, the system 1 determines if the crawler successfully resolves the challenge under the browser profile, and if so, at block 434 the browser farm employs the crawler and the scraper to access the website. If the crawler does not successfully resolve the challenge, at block 436 the response analyzer analyzes the headers and, if needed, executes a script from an alternate HTTP client library. At block 438, the developer determines if the approach successfully resolves the challenge with the header analysis, and if so, at block 440 the browser farm 40 employs the crawler and the scraper to scrape the target website. If the crawler does not successfully resolve the challenge, at block 442 the system 1 enables cookies in order to analyze cookies from the website. At block 442, the user employs a browser profile and manually crafts cookies to emulate user behavior. At block 444 the developer determines if the crawler is successful, and if so, at block 446 the browser farm employs the scraper to scrape the website. If the crawler is not successful, at block 448 the browser farm obtains residential internet protocol addresses from a residential proxy manager to access the website and employs the crawler with the residential IP addresses to access the website and scrape the website.

As will be appreciated, the conventional approach described with respect to FIG. 4 above is cumbersome and requires many error-prone steps to effect a web scraping countermeasure solution. Use of existing technology requires developers to perform time-consuming analysis and write website specific code to acquire the data. Conventional platforms may otherwise employ a naive retry mechanism without a deep understanding of the underlying website and the website's web scraping countermeasure underpinnings, resulting in low success rates and at high costs owing to the use of residential proxies.

Accordingly, implementations as described below provide a technical solution that improves the web scraping countermeasure solution by simplifying both the steps needed and reducing the need for bespoke coding or costly computational resources.

SUMMARY

Described herein are embodiments of technology to access and obtain structured data from web pages, and process them for, among other advantages, more efficient web scraping, website analysis, and creating knowledge databases, and providing more useful web page representation for other automated web page processing components.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

FIG. 1A shows an embodiment of a system for accessing and scraping webpages;

FIG. 1D shows an exemplary Action API specification;

Figure 2A:
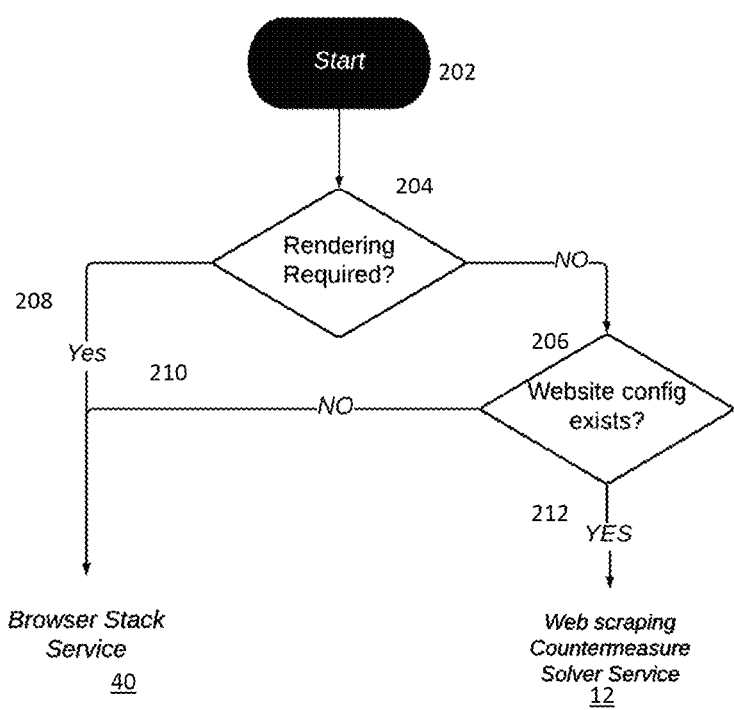
FIG. 2A shows an embodiment of a logical flow for an API gateway in accordance with at least one of the various embodiments.
Figure 2B:
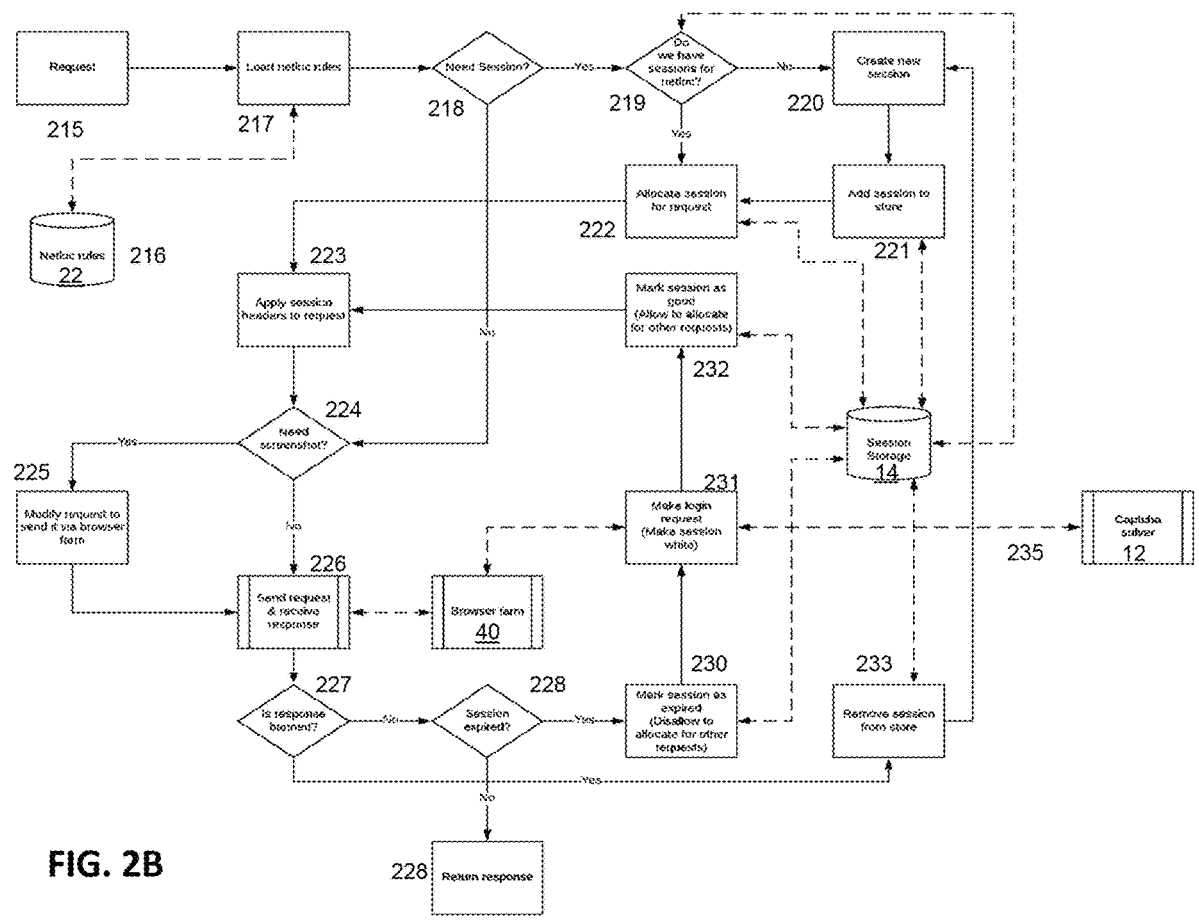

system;

FIG. 2B shows an implementation of a workflow for a session management

Figure 3:
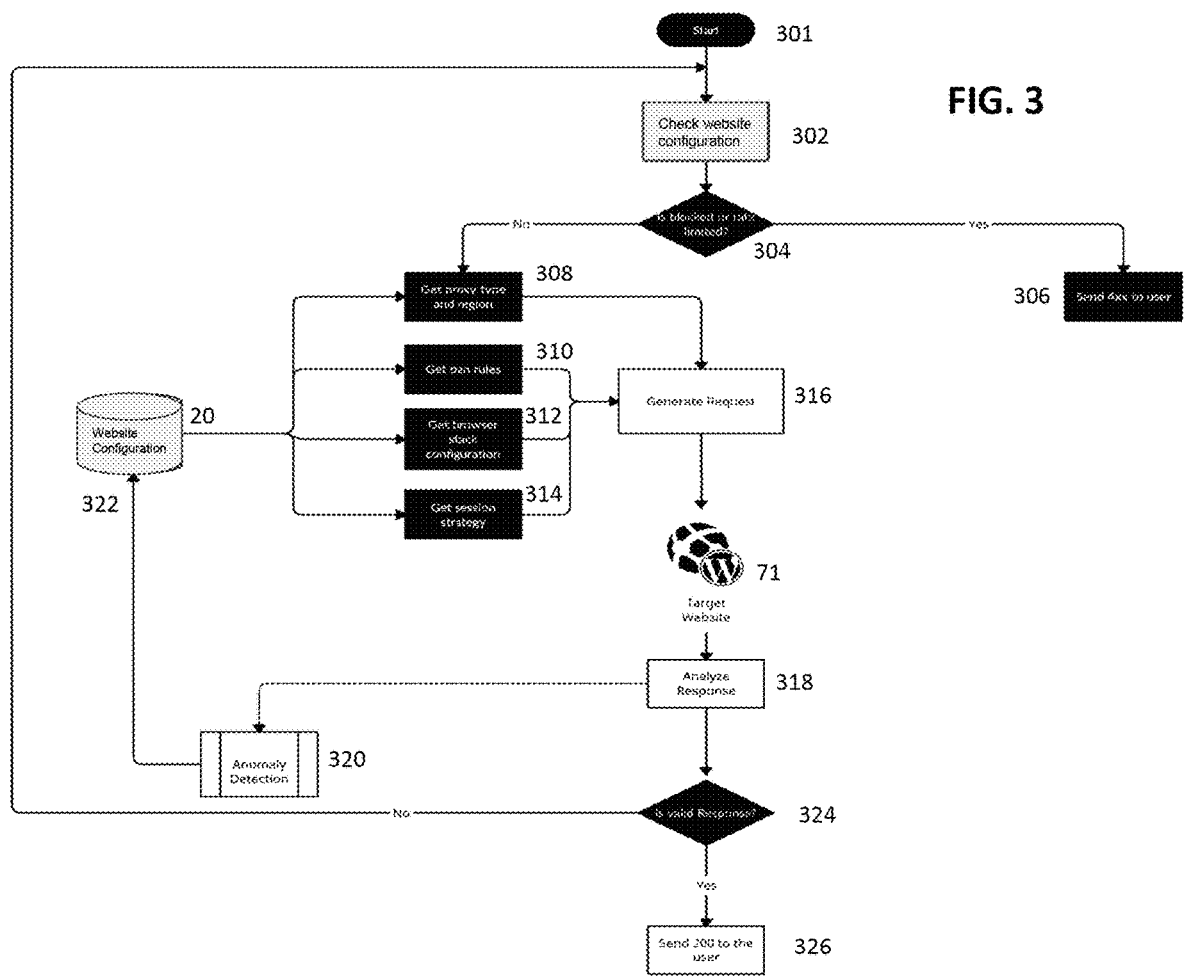
Figure 4:
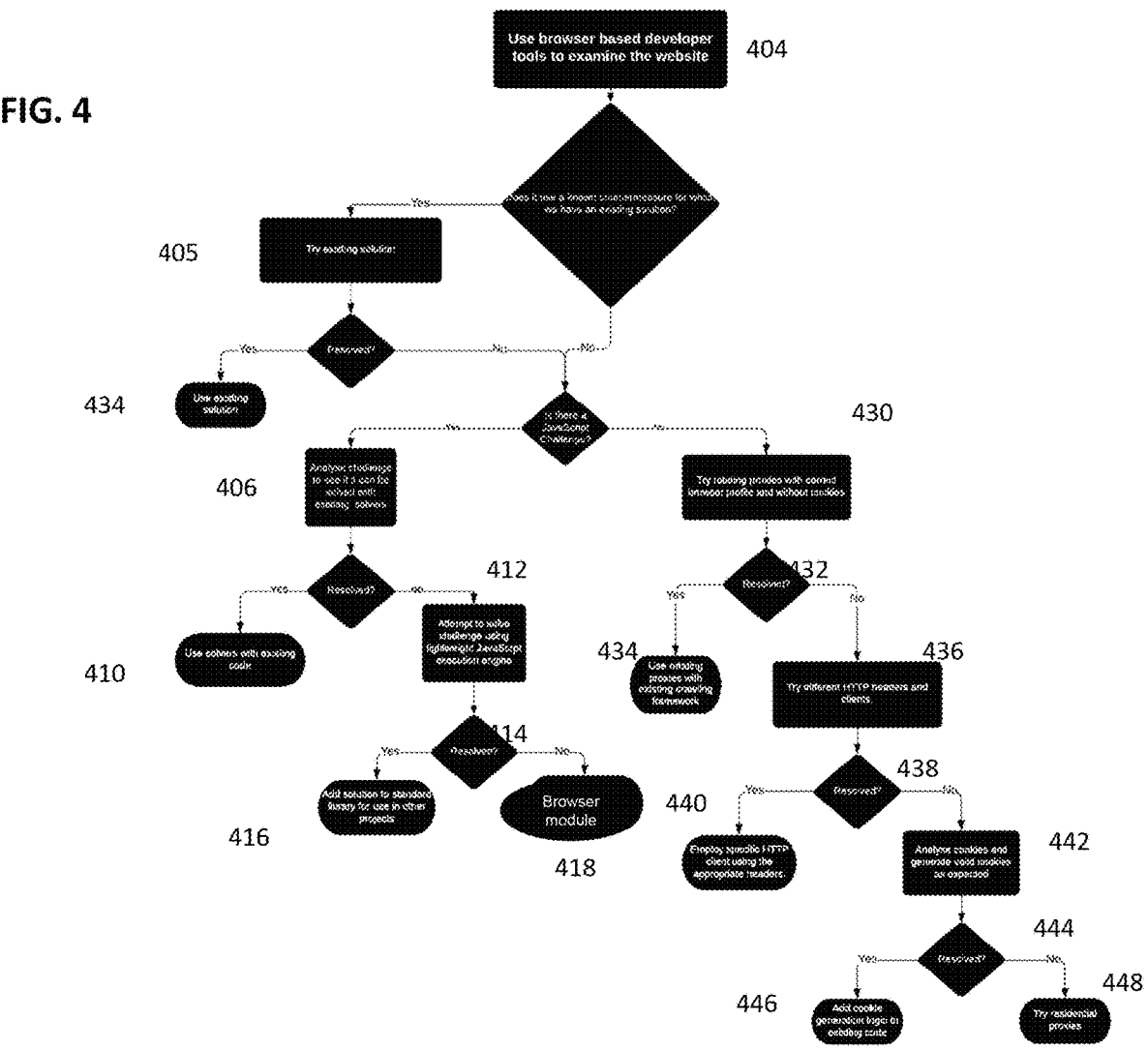
Figure 5:
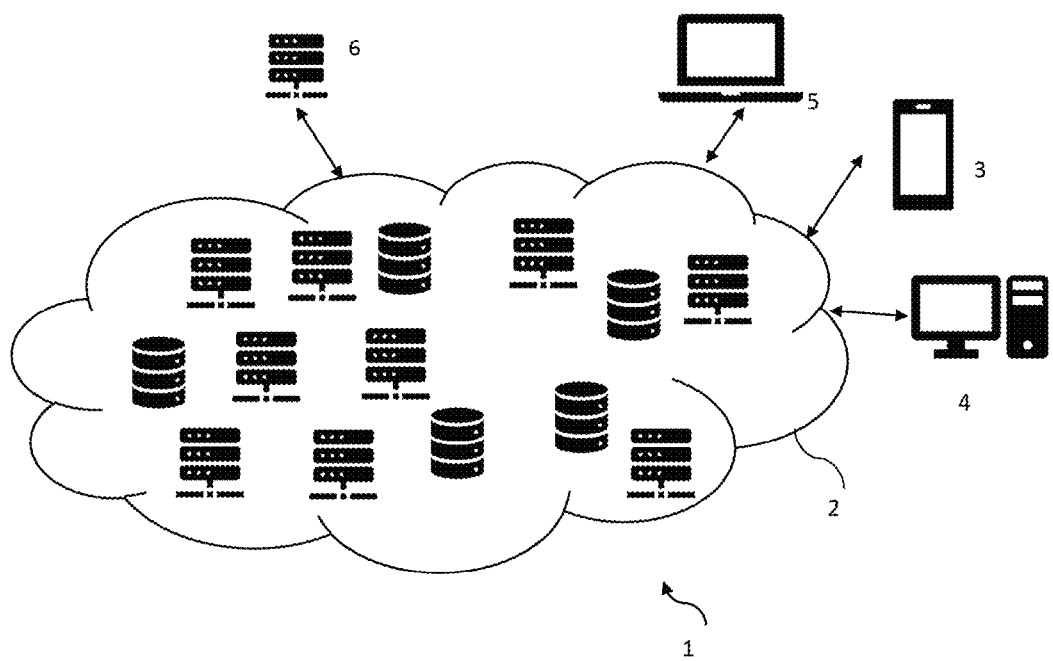

FIG. 3 is a flowchart and architecture for a webpage request and response analysis process in accordance with at least one of the various embodiments;

FIG. 4 is a flowchart for a conventional process in accordance with one of the various embodiments;

FIG. 5 shows an illustrative cloud computing environment for the system; and

Figure 6:
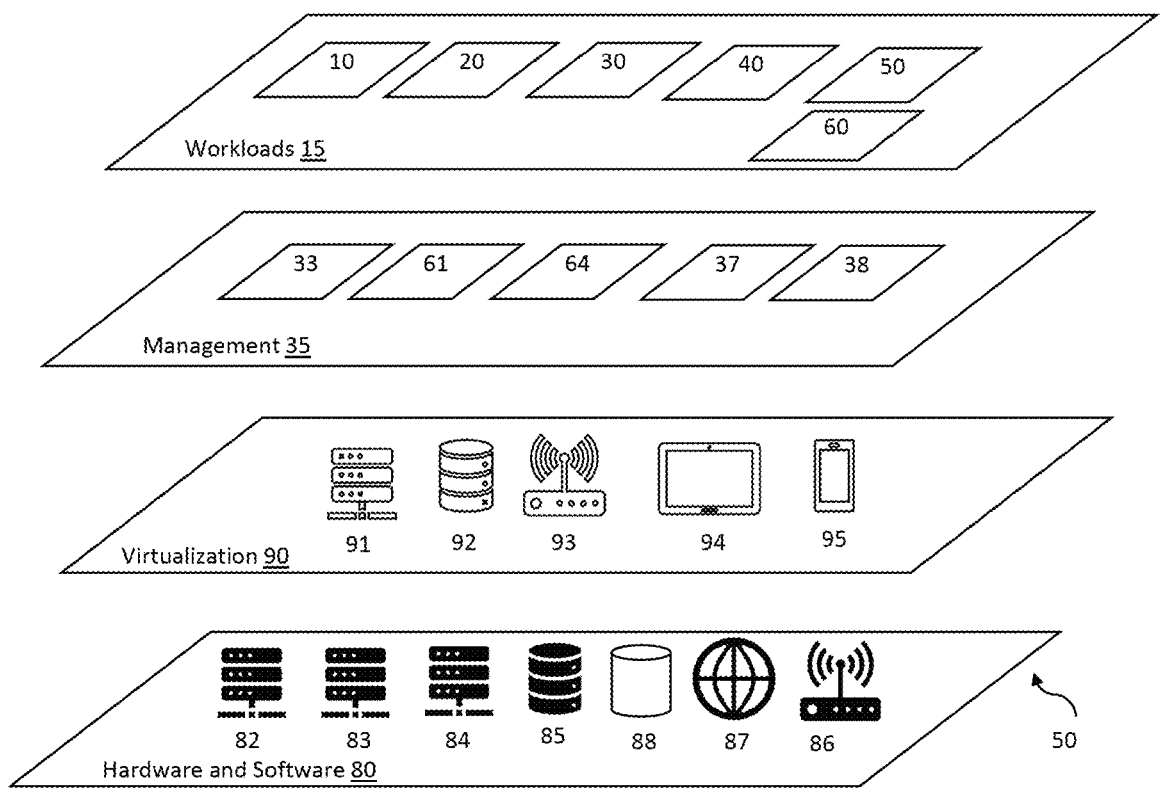

FIG. 6 shows an illustrative set of layers provided by an example cloud computing environment.

DETAILED DESCRIPTION OF THE EMBODIMENTS

Various embodiments now will be described more fully hereinafter with reference to the accompanying drawings, which form a part hereof, and which show, by way of illustration, specific embodiments by which the innovations described herein can be practiced. The embodiments can be embodied in many different forms and should not be construed as limited to the embodiments set forth herein. Rather, these embodiments are provided so that this disclosure will be thorough and complete, and will fully convey the scope of the embodiments to those skilled in the art. Among other things, the various embodiments can be methods, systems, media, or devices.

Throughout the specification and claims, the following terms take the meanings explicitly associated herein, unless the context clearly dictates otherwise. The term "herein" refers to the specification, claims, and drawings associated with the current application. The phrase "in an embodiment" or "in at least one of the various embodiments" as used herein does not necessarily refer to the same embodiment, though it can. Furthermore, the phrase "in another embodiment" as used herein does not necessarily refer to a different embodiment, although it can. Thus, as described below, various embodiments can be readily combined, without departing from the scope or spirit of the present disclosure.

In addition, as used herein, the term "or" is an inclusive "or" operator, and is equivalent to the term "and/or" unless the context clearly dictates otherwise. In addition, throughout the specification, the meaning of "a" "an" and "the" include plural references. The meaning of "in" includes "in" and "on."

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and can be within a single module or device or between one or more remote modules or devices.

For example, a computer hosting a web scraping and classification engine can communicate to a computer hosting one or more classifier programs, websites, and/or event databases via local area networks, wide area networks, direct electronic or optical cable connections, dial-up telephone connections, or a shared network connection including the Internet using wire and wireless based systems.

The following briefly describes embodiments to provide a basic understanding of some aspects of the innovations described herein. This brief description is not intended as an extensive overview. It is not intended to identify key or critical elements, or to delineate or otherwise narrow the scope. Its purpose is merely to present some concepts in a simplified form as a prelude to the more detailed description that is presented later.

Described herein are embodiments of web scraping technology for analyzing and providing technological solutions to web scraping countermeasures and web scraping countermeasure challenges. In at least one of the various embodiments, there is provided a system, method, and/or computer program product for scraping and processing a web page. In an implementation, the system comprises an input and a memory including non-transitory program memory for storing at least instructions and a processor that is operative to execute instructions that enable actions, the system comprising:

a configuration manager for identifying and managing a website configuration for a target webpage request based on one or more webpage configuration parameters, the configuration manager being configured to generate an enriched configuration profile of a target website;

a browser stack configured as a web browser client, wherein the browser stack is configured to execute webpage session requests to the target website that simulate manual user requests;

a session management server comprising:

a session database comprising session state data to persist a website session for the target website based on the configuration parameters for the enriched configuration profile of the target website from configuration manager;

the session management server being configured to manage webpage sessions including website access patterns that simulate manual web browsing behavior and user requests;

a custom solver configured to deploy a bespoke webpage solution for a webpage requirement comprising a web scraping countermeasure solver;

an application programming interface (API) operatively connected with the session management server and the configuration manager, the API gateway server being configured to obtain a browser stack configuration and a session strategy from the configuration manager for the session manager;

the API gateway being configured to route the target webpage request for fetching a target webpage from the target website based on one or more website parameters from the configuration manager, determine if the target webpage has a known configuration, and if not, execute the target webpage request for the browser stack and if so, route the target webpage request to the web scraping countermeasure solver; and a session analysis server comprising a response analyzer configured to process a response from the target website to the target webpage request to solve a web scraping countermeasure challenge from the target website and provide an antibot solution to the custom solver.

In an implementation the configuration manager can comprise a rule manager database comprising the one or more website configuration parameters. The configuration parameters comprise one or more of: a set of ban rules; a session strategy; a set of selectors; Javascript scripts; Proxy Type; Proxy Region; Website Specific Scripts; Retry Logic; Domain Structure; Page Structure; Page resources; Website Traffic Stats; or a combination thereof. The configuration parameters can also comprise one or more of: a regional split of traffic, a bounce rate, an average pages visited, a duration, a page SEO visibility, or a combination thereof.

In an implementation, the system can further comprise: a browser farm comprising a plurality of proxy servers configured as the browser stack, the session management server being operatively connected to the browser farm; and a router of the API gateway being configured to route the target webpage request to the browser farm for fetching the target webpage from the target website by one of proxy servers based on one or more website parameters from the configuration manager, determine if the target webpage has a known configuration, and if not, route the target webpage request to the browser farm, and if so, route the target webpage request to the web scraping countermeasure solver. The browser farm can comprise at least one of proxy server being configured with one or more of: a custom browser configured to prevent headless mode detection, a browser configured with patching functions, a headful browser configured for a web browser Operating System environment, a mobile device emulator, or a combination thereof. The browser farm can further comprise: the session database comprising a session cache comprising intelligent cookie and cache management to prevent poisoning and client detection, a policy database comprising a plurality of cache policies and request filters, and a custom script program comprising auto-executing scripts, including a script configured to mask a headless browser and a script to emulate real browser fingerprints. The browser farm can further comprise: a proxy server selector configured to select a proxy server type and a region for the proxy server to fetch a geofenced targeted content from the target webpage.

In an implementation, the system can further comprise: a circuit breaker configured for webpage fetching rate limits, the API being configured to determine, via the circuit breaker, whether the target website is blocked or rate limited, and the browser farm can comprise a retry mechanism configured to execute an optimum number of retries to fetch a targeted content from the target webpage.

In an implementation, the session state data can comprise a header, a browser profile, or a browser user directory.

In an implementation, the system can further comprise: a router configured with routing parameters comprising: a locale, a time of the day, the target website traffic condition, a page type, an action to be performed on the target webpage, or a combination thereof.

In an implementation, the system can further comprise: a logging server configured to log target webpage request responses; and the response analyzer further comprising a machine intelligence engine configured to train on web page response data in a training database of logged target webpage request responses to identify patterns and anomalies and generate one or more configuration profiles for the configuration manager based on the analysis.

In an implementation, the browser stack can comprise a stateless browser stack, and the API Gateway is directly integrated with at least: a proxy scheduler; a policy database comprising a plurality of cache policies and request filters; and a custom script program comprising auto-executing scripts, including a script configured to mask a headless browser and a script to emulate real browser fingerprints.

Figure 1B:
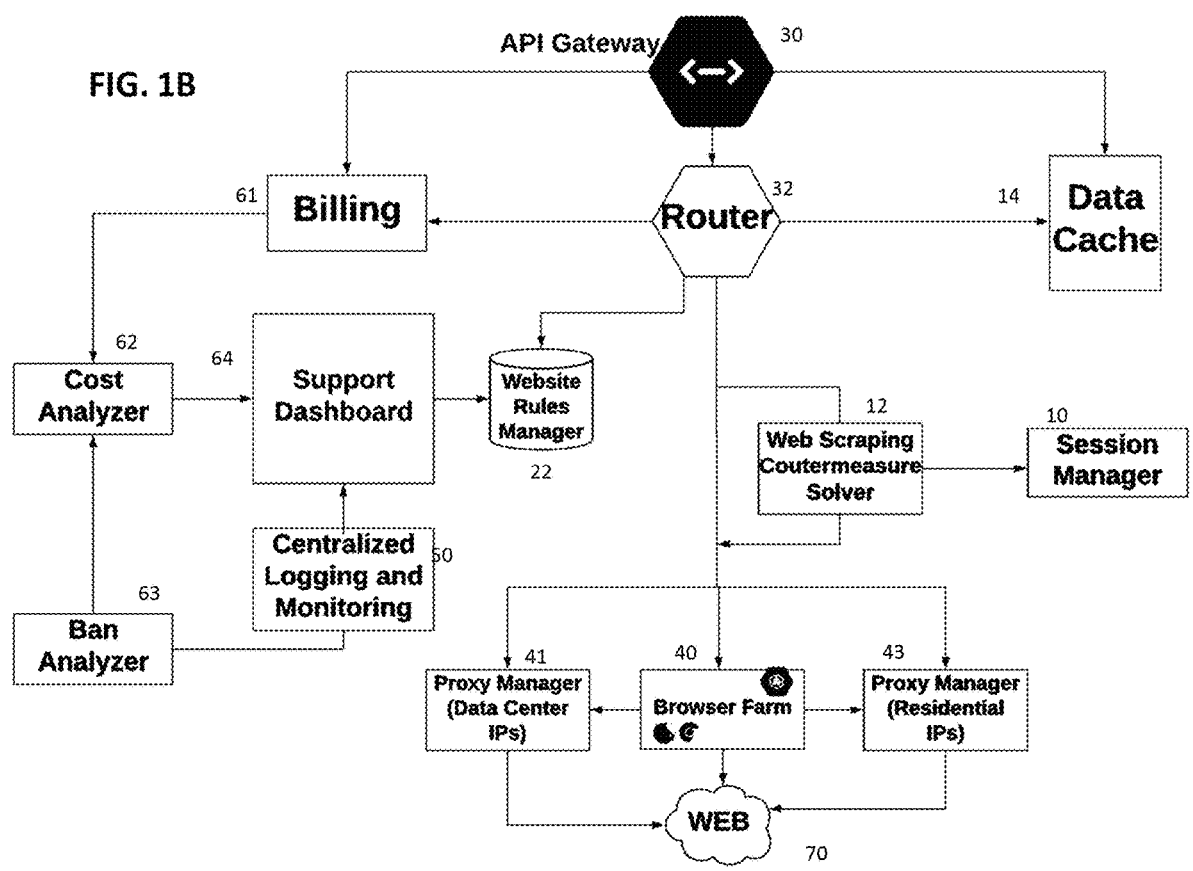
FIG. 1B shows a logical architecture and system flow for processing a webpage request in accord with an implementation.

FIG. 1A shows an embodiment of a system for accessing and scraping web pages. FIG. 1B shows a logical architecture and system flow for processing a webpage request in accord with an implementation.

In an implementation, FIGS. 1A-1B shows a scraping module application programming interface (API) gateway 30 between a session management service 10, a configuration manager 20 and a browser farm 40. The configuration manager 20 comprises a rules manager database 22 and is configured to identify and store a website configuration a website page request based on one or more webpage configuration parameters. The configuration manager is configured to generate an enriched configuration profile of a target website for a website request. The enriched semantic webpage of the website comprises: a website structure, a page type, a page visibility to search engines, a page domain (DOM) structure, and webpage traffic statistics. The configuration parameters for the enriched semantic webpage of the target website can comprise a set of ban rules, a session strategy, a set of selectors, a Javascript manager, a Proxy Type, a Proxy Region, Website Specific Scripts, Retry Logic, Domain Structure, Page Structure, Page resources, and Website Traffic Statistics. In an embodiment, the enriched configuration profile can be stored in a relational database.

A browser farm 40 comprises: a plurality of proxy servers 42a . . . 42n, each of which are configured as web browser clients (browser stacks). The proxy servers 42a . . . 42n are configured to execute webpage session requests to target websites 71 from a session management server 10 in a manner that that simulates manual user requests. A browser client is configured with a specific browser. The browser farm can be configured to choose the optimal proxy server 42a to launch the web browser client that is best for a given target website 71. For example, the website parameters for a target website can instruct the browser farm 40 to select a proxy server 42a that employs a Chrome™ web browser, a Firefox™ web browser, or a custom browser, depending on the parameters identified by the configuration manager 20 for that website 71. Browsers can be configured or modified to specialized scraping tools, for example, a custom browser to prevent headless mode detection, a browser configured with patching tools, a headful browser configured for a conventional web browser Operating System environment, and/or a mobile device emulator configured to emulate a browser launched from a mobile device (e.g., smartphone or tablet).

The browser farm 40 also comprises a session database 44 comprising session caches, including intelligent cookie and cache management to prevent poisoning and client detection, a policy database 46 comprising a plurality of cache policies and request filters, a custom script program 48 comprising auto-executing scripts, including a script configured to mask a headless browser, and/or a script to emulate real browser fingerprints. For example, in an embodiment, the browser farm 40 can use containerized autoscaling setup to orchestrate spawning of browsers and devices to meet downstream requirements. An exemplary application for containerized autoscaling can be, for example, a Kubernetes-based containerized autoscaling. The browser farm can be configured to manage the entire browser/device lifecycle. For example, the browser farm can comprise a proxy manager 41 is configured to execute cache policies and request filters or a custom script program. The browser farm can include a program or algorithm for, when executed by the processor, performing some or all of these actions: rendering a web page in a web browser, downloading of the related resources like images or CSS files, executing JavaScript and other instructions, obtaining screenshots of web pages and its parts, measuring on-screen coordinates, colors, visibility, and other properties of HTML elements and other parts of web pages, obtaining final HTML representation of the web pages, and automatically executing commands to control the browser.

In an embodiment, the browser proxy farm is configured to generate browser fingerprints and implement custom scripts 48 into browser context before a page load. In an embodiment, page and browser contexts can be isolated from the management process by the session management server 10. The browser stack also includes session database 44 logic to solve web scraping countermeasures 47 (e.g. CAPTCHAs) and leverages the browser stealth to solve Javascript challenges. The browser farm 40 also comprises a custom solver tool comprising a session manager web scraping countermeasure solver configured to deploy a bespoke webpage solution for a webpage requirement, including a unique or unusual webpage requirement. The browser stack session database 14 is also configured to use similar user visits to the website to avoid recurrent Javascript challenges or CAPTCHAs and simulate user-like website access patterns.

In an embodiment, the browser proxy farm 40 can be configured to include a rich "smart browser" actions API configured for users to perform both low-level actions such as click and type, and also perform more complex actions such as paginating, searching keywords and infinite scrolling. An advantage of this API configuration is that these actions are undetectable to web scraping counter measure technology as they simulate real human behavior.

For example, the actions API can be configured to abstract away Playwright, Puppeteer and CDP. The API is configured to expose low level actions such as click, type, hover, and so on, that mimic human behavior The API can be also configured to expose high level actions such infinite scrolling (scrollBottom), and keyword searching, (searchKeyword), waiting for a request, and waiting for a response. As will be appreciated, such actions are executed on the page context. In an implementation, the API can be configured to allow a user to implement custom scripts.

The Action API can be configured to mimic, for example, Navigation, Delayed Navigation with WaitFor, Infinite scroll with scrollBottom, PerimeterX Human CAPTCHA, and a Complex Action Sequence—(e.g. set location for website request).

In an embodiment, the browser proxy farm can include a light-weight custom client that has a same TLS fingerprint as known browsers and browser engines (e.g.: Chrome and Chromium based platforms) and provide cost-efficient, light-weight and high performance capability to a smart browser. For example, in an implementation, a browser source can be modified to include the Action API and smart browser components. A browser shared library can be built to comply with the modified browser code. The browser library can be invoked by an API addon which can be used by smart browser back-end code. For example, for Chrome or a Chromium based browser, the Chrome source code can be modified to include the smart browser components. The Action API and smart browser can be implemented in a Node.js wrapper layer as addon code that drives the browser using the chrome devtools protocol Smart browser backend code can then employ the addon and expose it to the user as a REST API. An exemplary API specification is shown in FIG. 1D.

The browser farm also comprises a proxy manager 43 configured to interface with external proxy servers 49. The proxy manager comprises a datacenter and residential proxies based on downstream requirements such as region, session id, target website, and other requirements. The proxy manager 43 scheduler also takes into account the number of connections to the same IP address, last used time as well as usage history. The proxy manager 43 can be configured to select a proxy server type and a region for a proxy server 49, which are routed via external IP addresses, to fetch a geofenced targeted content from the webpage.

The browser farm 40 also comprises a circuit breaker 35 and rate limiter for stopping or slowing a web traffic flow from the API gateway. The circuit breaker 35 can be configured for global webpage fetching rate limits to prevent degradation and service performance of a target website 71 and to provide federated access to the underlying content of the target website 71.

In an embodiment, the session service 44, the proxy scheduler service (PSS), policy database 46, and the custom script program 48 can be integrated directly in the API gateway 30 (not shown). Instead of a browser farm, a stateless browser stack can be employed for downloading websites. An exemplary stateless browser can include, for example, a serverless container run on a clustered node cloud integration. For example, the stateless browser can be a serverless deployment such as Knative serving and eventing platform executed on Kubernetes API.

An exemplary stateless browser API specification can be configured to process a single URL, return the result. In an implementation, at least one of the following properties is set to true: browserHtml, httpResponseBody, and screenshot.

The API can be configured to request a combination of "browserHtml" and "screenshot." However, in an implementation, the httpResponseBody request is not combined with browserHtml or screenshot. A schema for an exemplary request body for the API is given in Table 2.

TABLE 2

REQUEST BODY SCHEMA: application/json

| | |
|---|---|
| url | String |
| required | An absolute URL to extract data from. |
| requestHeaders | object (RequestHeaders) |
| | Subset of the request headers fields that are a part of section 5 of RFC 7231. This is an advanced feature that can impact web scraping countermeasure performance, and hence can be tested before being used in production. Action functionality can be used to help to avoid the use of raw HTTP headers, which can be error-prone. |

TABLE 2-continued

REQUEST BODY SCHEMA: application/json

| | |
|---|---|
| httpRequestMethod | string<br>Enum: "GET" "POST" "PUT" "DELETE" "OPTIONS" "TRACE" "PATCH"<br>The HTTP method to be used as part of the request |
| httpRequestBody | string <byte><br>Content to be sent to the server as part of the request. The data set can be base64-encoded. This cannot be used with browserHtml. |
| customHttpRequestHeaders | Array of objects (CustomHttpRequestHeader) [ items ]<br>Any set of headers required for a specific use case. Headers provided as part of this parameter override the default headers. This is a feature that can impact web scraping countermeasure performance.<br>This feature cannot be used with browserHtml, only with httpResponseBody<br>This feature cannot be used with requestHeaders.<br>Certain headers may be overridden by the system owing to website-specific configuration to alleviate bans.<br>Cookie headers will be ignored.<br>User-agent cannot be overridden. Action functionality can be used to alleviate the need for passing raw HTTP headers. |
| httpResponseBody | boolean<br>Default: false<br>Return the raw HTTP response without browser rendering. When true, the response contains the "httpResponseBody" field with the result. |
| httpResponseHeaders | boolean<br>Default: false<br>Return the HTTP headers received in the HTTP response. When true, the response contains the "httpResponseHeaders" field with the result. |
| browserHtml | boolean<br>Default: false<br>Return the HTML of a web page after browser rendering. When true, the response contains the "browserHtml" field with the result. |
| screenshot | boolean<br>Default: false<br>Return a screenshot of the target web page.<br>When true, the response contains a screenshot field with the screenshot file data.<br>Screenshots are taken with a web browser viewport resolution of 1920 × 1080 pixels.<br>Use the screenshotOptions field to customize screenshot options. |
| screenshotOptions | object (ScreenshotOptions)<br>Options for the screenshot taken when the screenshot field is true. |
| geolocation | string (CountryCode)<br>Enum: "AU" "BE" "BR" "CA" "CN" "DE" "ES" "FR" "GB" "IN" "IT" "JP" "MX" "NL" "PL" "RU" "SI" "US" "ZA"<br>Geolocation to access web pages from. The ISO 3166-1 alpha-2 country code.<br>Default value depends on the target website. |
| javascript | boolean<br>Turn JavaScript ON or OFF during browser rendering. The default value depends on the target website. |
| actions | Array of objects (ActionSequence) [ items ]<br>Sequence of browser actions to be performed on a page |
| jobId | string (JobId) <= 100 characters<br>Optional ID passed by the client. |
| echoData | any<br>This field is returned in the response, verbatim. The request can be rejected if the data is too big. |

An exemplary Response Schema for the API is given in Table 3. A successful response includes the requested output.

TABLE 3

RESPONSE SCHEMA: application/json

| | |
|---|---|
| url<br>required | string<br>URL the data was extracted from. Could be different from the input URL in case of redirects. |
| statusCode | integer<br>The HTTP status code retrieved from the target web page after following all the redirections. In case of redirections, the response may not come from the input URL. See the url property. |
| httpResponseBody | string <byte><br>Raw HTTP response from the target webpage, even if it is binary data (e.g. an image). The response will be base64-encoded. To get this field in the output, set "httpResponseBody" to true in the request. This field is not available with browserHtml and will result in a 4xx error. |
| httpResponseHeaders | Array of objects (HTTPHeader) [ items ]<br>Original headers returned by the target website. To get this field in the output, set "httpResponseHeaders" to true in the request. The "Content-Encoding" header |

TABLE 3-continued

RESPONSE SCHEMA: application/json

| | |
|---|---|
| | value (e.g. gzip, br, etc) can be ignored, since Zyte API already decompresses the body of compressed responses. |
| browserHtml | string<br>HTML of a web page after browser rendering. To get this field in the output, set "browserHtml" to true in the request. |
| screenshot | string <byte><br>Base64-encoded screenshot of the target web page.<br>Set screenshot to true in your API request to get this field. |
| echoData | object<br>This field is returned in the response, verbatim. To get this field in the output, pass "echoData" in the request. |
| jobId | string (JobId) <= 100 characters<br>Optional ID passed by the client. |
| actions | Array of objects (ActionResult) [ items ]<br>Returns detailed information about the elapsed time and errors for each action in the actions sequence, to help diagnose any issue. The order of the actions of the submitted request is retained in the response. |

Advantages of a stateless "browserless" API include the ability to have a single API instead of multiple platforms, no cookie or IP management, a smart browser that can manage TLS fingerprinting, and an improved developer interface and experience.

For example, in an implementation, a browser source code can be modified to include the stateless browser components. A browser shared library can be built to comply with the modified browser code. The browser library can be invoked by an API addon which can be used by smart browser back-end code. A stateless browser can be implemented as a lightweight HTTP client with support for HTTP/1.1, HTTP/2 and HTTP/3 (QUIC) and configured for low resource utilization and low latencies. In an implementation, the stateless browser can also be implemented in a NodeJS http client, for example, got, axios or cross-fetch. The stateless browser can be configured to have the same passive client fingerprint as major browsers (e.g.: Chrome, Mozilla Firefox, Edge, Opera, etc.).

In an example, an HTTP client (such as cURL, Quiche, okhttp, etc.) can be modified to implement the stateless browser components as described above. The HTTP client may include source code to be modified, and may be built as a shared library. This library can be implemented for common user platforms such as Android, iOS, or other native applications. For high level network services, a service network database can be built for the components. The stateless browser can be implemented, for example, in a Node.js, Java, Rust, or other wrapper layer as addon code, which invokes the HTTP client shared library. As noted above, in an embodiment, a smart browser backend code can then employ the addon. An exemplary API specification for a stateless browser is shown in Tables 1-3 above.

A proxy scheduler and proxy scheduler service (PSS) can be configured to provide proxies in real time. The PSS decides which proxy to provide based on real time feedback of proxy usage (i.e. clients share their usage experience with the PSS as soon as possible and the PSS can be configured to learn from the usage). In an implementation, the proxy scheduler service can comprise a predefined number of PSS workers. The PSS can be configured so that a proxy set is sharded equally across a predefined number of PSS workers.

Every worker can read its proxy assignments, for example from a compacted Kafka topic, and maintain an in-memory projection of its assignment. A "per-netloc," "per-org" and "per-netloc-org configuration" can also be read from a Kafka compacted topic by every worker independently, and the projection is kept updated. Limit events can be read from a dedicated topic and applied to requests until the time they are effective.

A session management server 10 is operatively connected to the browser farm via the API gateway comprises a session database 14 comprising session state data to persist a website session for the target website 71 based on the configuration parameters for the enriched semantic webpage of the target website from configuration manager 20. The session state data comprises a header, a browser profile, and/or a browser user directory for the target website 71. The session management server 10 is configured to emulate an organic crawling behavior and simulate manual web browsing behavior and manual user requests based on the configuration parameters from the configuration manager 20. Configuration parameters to persist a session can comprise, for example, a regional split of traffic, a bounce rate, average pages visited, a duration, and/or a page SEO visibility. For example, a session can either consist of a combination of header, browser profile and proxy or the browser user directory. The session management server 10 can be configured to take a combination of approaches to store session state, such as persisting session information in a database, persisting connections with a browser that includes the session state or storing browser user directory on a network file storage to reuse the session based on the use case and target website.

An exemplary session management and PSS workflow is shown and described with respect to FIG. 2B below.

In an embodiment, the system 1 comprises a logging server 50 configured to track and log target webpage 71 request responses from the browser farm 40. The logging server can provide session data to a web data store 52. Session tracking data can include for example, files that comprise, for example, session response bodies, timings, resource types, cookies, and session metadata, such as HTTP archive (HAR) files. Logged data can also be annotated manually to annotation data stores 54 for, inter alia, machine intelligence training by a session analysis server 60 as described below.

In an embodiment, the system comprises a session analysis server 60 comprising a response analyzer 63 configured to process the logged responses to a webpage request, the response analyzer 63 comprising: a machine intelligence engine 66 configured to train on web page response data in a response database 68 to identify patterns and anomalies, and generate one or more configuration profiles for the configuration rules manager 22 based on the analysis.

Machine intelligence engine 66 can comprise Artificial Intelligence (AI) machine learning (ML)-based processing and classification. AI machine learning classification can be based on any of a number of known machine learning algorithms, for example, neural nets (including fully connected, convolutional and recurrent neural nets, or neural nets created as a combination of these blocks), decision trees, conditional random fields (CRFs), propositional rule learner, logistic regression, and the like). In at least one embodiment, ML-based processing engine 66 is implemented as a multi-modal neural network. AI machine intelligence engine 66 can be separated into inference and training (classifier building) components, which can be employed at different points of time.

The machine intelligence engine 66 can include a rule-based classification and extraction module 65. If present, rule-based classification and extraction module 65 can process results of the proxy manager 41, cache policy and requests 46, or process results of the AI processing engine 66, or combine results, or do all of these tasks, or any combination of these tasks.

The session analysis server 60 can comprise memory 68 including a number of data stores that can be hosted in the same computer or hosted in a distributed network architecture. The machine intelligence engine 66 comprises a web page data store 52 for a set of logged, tracked and processed web pages, which can contain images, HTML, measurement results and other metadata about web pages. The session analysis server 60 can further include an annotation data store 51 for human-provided annotations, including examples of the desired classification and extraction results for a set of input web pages. The session analysis server 60 can further include parameters and configuration classifier store 69 for storing solution classifiers, as well as a classifier model building (training) program 67 for, when executed a processor, training and evaluating ML algorithms for target web page 71 solution, profile classification, and extraction, and storing the resulting parameters and configurations in classifier store 69, using either a training database from the web page data store 52 of tracked and logged web page data, or the annotation data store 51 of human-provided annotations, or both as a training data. The classifier model building program 67 can be employed to build classifiers operable to classify profiles and solutions for other web pages and other web sites, based on learning from the previously classified web pages.

The session analysis server 60 response analyzer 63 can be configured to analyze sessions to provide machine intelligence to automatically detect bans, CAPTCHAs and other anomalies. The response analyzer can be configured to process HTTP archive (HAR) files which contains, for example, session response bodies, timings, resource types, cookies, and session metadata through a machine learning pipeline to identify patterns and anomalies, as well as web scraping countermeasure solver 12 solutions, which can then be provided to the to the configuration rules manager database 22 and/or the browse farm policy database 46 and scripts database 48. In an embodiment, the session analysis server analyzes the web page data to identify the configuration profile parameters as disclosed herein and provides these to the to the configuration rules manager database 22 for the creation of an enriched semantic webpage.

In an implementation, a scraping module application programming interface (API) gateway 30 is configured to process a webpage request between the session management server 10, the configuration manager 20 and the browser farm 40, and the API gateway 30.

As shown in FIG. 1B, the scraping module API gateway 30 comprises a router 32 configured to route web page requests to the plurality of the proxy servers 42*a* . . . 42*n*, of the browser farm 40 based on one or more website parameters from the configuration manager 20. The API Gateway 30 comprises a tracer configured to trace the webpage through one or more components. An exemplary tracer can be, for example, OpenZipKin. The API Gateway 30 can be configured to be exposed to track user intent such as actions to perform on the page, HTTP methods pertaining to the request, customer scripts etc.

Figure 1C:
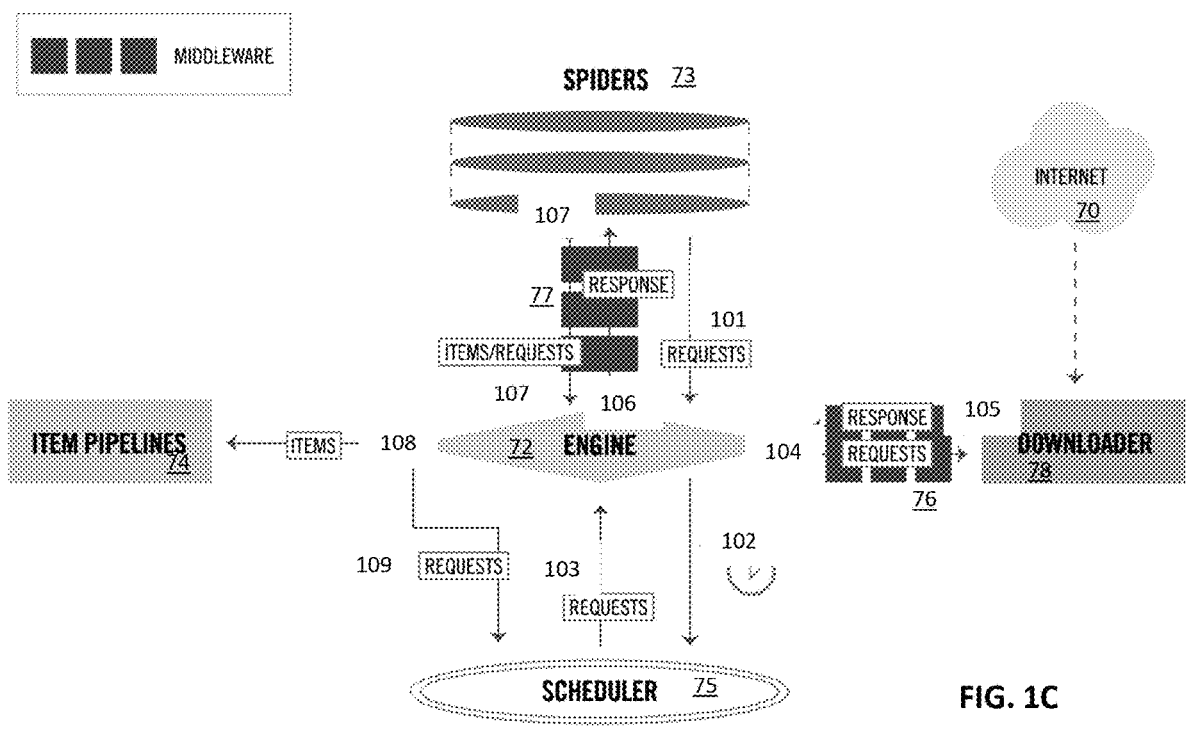
FIG. 1C shows an exemplary architecture for a web scraper.

An exemplary architecture for a web scraper is shown in FIG. 1C. As shown in FIG. 1C, an execution engine 72 is configured to control a scraping data flow for the web scraper. In an implementation, the web scraper and website specific code is external to the architecture, and the execution engine accepts requests via and API downloader.

At block 101, the engine 72 obtains one or more requests to crawl a targeted websites 71 from a spider 73 of a crawler 41. At block 102 the engine 106 schedules the requests in a scheduler 75 and asks for the next requests to crawl. At block 103, the scheduler returns the next requests to the engine 72. At block 104, the engine sends the requests to a downloader 78, passing through a downloader middleware 76. Once the page of the targeted website 71 finishes downloading, at block 105 the downloader 78 generates a response with the page and sends it to the engine 72, passing through the downloader middleware 76. At block 106, the engine 72 receives the response from the downloader and sends it to the crawler 41 spider 73 for processing, passing through the crawler middleware 77.

At block 107, the spider 73 processes the response and returns scraped items and new requests to the engine 72, passing through the spider 77 middleware. At block 108, the engine sends processed items to item pipelines 74, then at block 109 sends processed requests to the scheduler 75 and asks for possible next requests to crawl. The process repeats starting at block 101 until there are no more requests from the scheduler 75. Results are sent back to the external web scraper.

FIG. 2A shows an embodiment of a logical flow for an API gateway 30 decision to process a web request. As shown in FIG. 2A, at block 204 the API gateway 30 is configured determine if webpage rendering is required for the requested webpage, and if so, at block 208, instruct the router 32 to route the webpage request to the browser farm 40 for rendering by one of the proxy servers 42*a* . . . 42*n*, for rendering by the web browser. If webpage rendering is not required for the requested target webpage 71, at block 206 the API Gateway 30 accesses the configuration manager 20 and determines if the web page has a known configuration. If the configuration manager 20 does not have a known configuration for the target website 71 for the request, at block 210 the API Gateway 30 routes the webpage request to the browser farm 40 for fetching by one of proxy servers 42*a* . . . 42*n*. If the configuration manager 20 provides a known configuration for the target website, at block 212 the router 32 routes the request to the web scraping countermeasure solver 12 to provide the known solution for resolving a known antibot challenge protocol 47 for the website. In an implementation, the web scraping countermeasure solver 12 and session analysis component acquire proxies from the proxy farm and pass it to the browser stack via an API.

Exemplary challenge protocols for a website can include, for example a CAPTCHA challenge, gesture detection tracking beacons, Javascript challenges, and other web scraping countermeasure challenges.

In an embodiment, the configuration parameters can include routing parameters for a target webpage 71, which can comprise one or more of factors such as a locale, a time of the day, a website traffic condition, a page type, and an action to be performed on the webpage. The router 32 can automatically route the request to the browser farm 40 for fetching by one of proxy servers 42*a* . . . 42*n* based on the known routing parameters.

An exemplary PSS proxy scheduling workflow for a session manager 10 is shown in FIG. 2B. The PSS workflow can comprise the following steps. First, at block 215 an external client sends a request to an entrypoint component via the API gateway 30. An allocation request is made to the PSS to allocate a proxy with a client request included. A PSS client request analysis can include:

- Checking org and org-netloc limits;
- Checking if a request is relevant to limits generated by a LimitsChecker component, and if so, applying it;
- Choosing a proxy;
- Marking it as allocated; and
- Returning a response.

At block 216 the system accesses a netloc rules configuration manager database 22 and checks the organization and organization netloc limits. At block 217, the system loads netloc rules for the organization's website configuration. Then at block 218, the system then queries if a session is needed. If so, at block 219 the session manager 10 accesses the session storage database 14 to determine if there are stored sessions for that organization's netloc configuration. If so, the system proceeds directly to block 222 and allocates the session for the request. If not, at block 220 the system generates a new session. At block 221, the session manager stores the session profile in the session storage database 14. Then the system proceeds to allocate the session at block 222. Accordingly, when request is received from the client, its eligibility for session rotation is checked. If positive, at block 220 a new session is created and allocated at block 222, or at block 219 a session reused and allocated at block 222.

At block 223, the system applies session headers to the request. At block 224, the system determines if there is a need for a screenshot. If not, the system proceeds to block 226 to send the request to the browser farm 40. If so, at block 225 the system modifies the request to include the screenshot request to send to the browser farm 40. In an implementation, the request can be enriched with metadata from a session, and then the request is passed for fetching or rendering. For example, an exclusive lease for "netloc+org" of a single proxy can be called a session by proxy providers. In an implementation, metadata can be added to this lease, for example, as headers at block 223, but can be implemented as request parameters of any kind.

At block 226 a request is sent to the browser farm 40 for a proxy, where a response is collected or failure is encountered. A response is evaluated: an outcome can be one of banned, challenge encountered; or success. At block 227, the system determines if the response is banned. If not, at block 228 the system determines if the session is expired. If not, at block 229, the system returns a response. If so, at block 230 the session is marked as expired and then disallowed to allocate to other requests. An entrypoint component can make a deallocation request to the PSS. Then at block 231 the system makes a login request to allow the session. If a challenge is encountered at login, at block 235 the system can employ a web scraping counter measure solver 12 as described herein. If the login request is successful, at block 232 the session is marked as good and saved to the session storage database 14 to allow for other requests.

When the request is sent at block 226, if the response is banned, at block 233, and the session profile for the request is removed from the session storage database 14. Then the system returns block 220 to generate a new session and proceeds as described above. In case of a "banned" response, the session is considered blacklisted, and at block 233 can be deallocated and removed from the session storage 14. In implementation, if a challenge is encountered, the session can then be temporarily marked as not available, and passed to a separate thread at block 235 to employ a web scraping counter measure solver 12 as described herein. Challenge solving could either end up successful or as in failure. In case of success, at block 232 the session is marked as available, or if not, the session is deallocated.

In an implementation, a LimitsChecker component is configured to run as a background process. The LimitsChecker is configured to read PSS worker updates and count a burning rate per netloc and organization. Also, the LimitsChecker can keep configuration projections up to date. Once limits are reached either by organization or by a netloc, a message indicating that limit is hit is sent to a topic with limiting events. Every limiting event will have a TTL, and can also be discarded by sending another message.

Sessions can be rotated within a bucket, which can be identified by a netloc and clientId. Therefore, if multiple users are requesting a website (e.g.: Amazon), each of them can get a dedicated bucket with sessions to prevent them affecting each other. Session buckets can grow depending on usage and organization limits. Also, session rotation can be executed using different algorithms. Implementations can be in various website-dependent middleware.

In an implementation, routing can be via an HTTP RPC. For example, in a cluster-based implementation (e.g., Kubernetes), each PSS worker can be implemented as a pod. Each pod gets a virtual IP address, and a DNS name within the internal cluster network. A client can query an API periodically and discover available PSS workers. Requests and session endpoints are sent to the same PSS instance where the session is handled. Non-session requests are sent to PSS workers using round-robin rotation. Deletion requests must be made to PSS worker handling the lease. To locate a target instance where a specific session is stored, a projection of session location topic can be maintained on every PSS client. A location is written to this topic every time a session bucket is created. For an alternative to HTTP RPC, a NATS implementation can be configured such that a PSS worker discovery and message transfer can be performed by NATS itself.

In an implementation, a main handler of the PSS worker can run in a single thread and update all its data structures sequentially. Incoming connections acceptance, keeping projections up to date, and message production can run in separate threads.

In an embodiment, as shown in FIG. 3, the system 1 can be configured to perform webpage request and response analysis and obtain or update configuration parameters. After a start block 301, at block 302 the API Gateway 30 is configured to check the configuration manager 20 to determine if the target website 71 has a known configuration. At block 30, the API Gateway is 30 configured to determine if the target website is blocked or rate limited by the circuit braker 35. If so, and if not blocked, at block 306 the API Gateway 30 routes the request to the browser farm 40 to fetch the website content using a retry mechanism configured to execute an optimum number of retries to fetch a targeted content from the webpage. The system is configured to automatically continue retries as it tries to bypass the underlying web scraping countermeasure. The system is configured to return a ban response only after exhausting all internal retries.

If the configuration parameters indicate the site is not blocked, at block 308 the API Gateway obtains a proxy server type and a region for the proxy server to fetch targeted content from the target webpage 71. At block 310 the API Gateway 30 obtains web scraping countermeasure rules from the rules database 22 of the configuration manager 20. At block 312 the API Gateway 30 obtains a browser stack configuration from the configuration manager. At block 314 the API Gateway 30 obtains a session strategy from the configuration manager 20 for the session manager 10. At block 316 the session manager server 10 generates the request and API Gateway 31 routes the request to browser farm 40 to fetch the target website 71. At block 318 a session analysis server 60 comprising a response analyzer 63 processes responses to the webpage request. At block 324, the system determines if the response to the request is valid, and if so, at block 326, sends a confirmation to the user. If at block 324 the response is not valid, the session analysis server 60 starts the process again after the start block 301.

When analyzing at block 318, the system is configured to process the response for anomaly detection at block 320. At block 320, the response analyzer 63 is configured to identify inconsistent responses such as malformed HTML, CAPTCHA, or JS challenges. In an embodiment, a machine intelligence engine 66 of the response analyzer 63 is configured to train on web page response data in a response database 68. At block 320 the response analyzer identifies patterns and anomalies in the responses. The response analyzer is configured to employ the classifier to classify webpage requests to the target website 71 into a static asset, tracking beacons, etc. The response analyzer is configured to check the response body, headers, and HAR and make a determination of whether the response is valid or not.

At block 322 the system 1 generates one or more configuration profiles for the configuration manager 10 based on the analysis, which is stored in the rules database 22. As such, the next time the system 1 makes a request for a target website, the configuration manager 20 has new or updated known parameters and solutions for the website 71.

In at least one embodiment, a system or a network computer, comprises a network computer including a signal input/output, such as via a network interface or interface unit, for receiving input, such as URLs of pages, to extract data from or content of these pages 71, a processor and memory that includes program memory, all in communication with each other via a bus. In some embodiments, processor can include one or more central processing units. In some embodiments, processor can include additional hardware devices such as Graphical Processing Units (GPUs) or AI accelerator application-specific integrated circuits. As illustrated in FIG. 1A, network computer also can communicate with the Internet 70, or some other communications network, via network interface unit, which is constructed for use with various communication protocols including the TCP/IP protocol. Network interface unit is sometimes known as a transceiver, transceiving device, or network interface card (NIC). Network computer 1 also comprises input/output interface for communicating with external devices, such as a keyboard, or other input or output devices not shown. Input/output interface can utilize one or more communication technologies, such as USB, infrared, Bluetooth™, or the like.

Memory generally includes RAM, ROM and one or more permanent mass storage devices, such as hard disk drive, flash drive, SSD drive, tape drive, optical drive, and/or floppy disk drive. Memory stores operating system for controlling the operation of network computer. Any general-purpose operating system can be employed. Basic input/output system (BIOS) is also provided for controlling the low-level operation of network computer. Memory can include processor readable storage media. Program memory, that can be a processor readable storage media, can be referred to and/or include computer readable media, computer readable storage media, and/or processor readable storage device. Processor readable storage media can include volatile, nonvolatile, removable, and non-removable media implemented in any method or technology for storage of information, such as computer readable instructions, data structures, program modules, or other data. Examples of processor readable storage media include RAM, ROM, EEPROM, SSD, flash memory or other memory technology, optical storage, magnetic storage devices or any other media that can be used to store the desired information and can be accessed by a computer.

Memory further includes one or more data storages, which can be utilized by network computer to store, among other things, applications and/or other data. For example, data storage can also be employed to store information that describes various capabilities of network computer. The information can then be provided to another computer based on any of a variety of events, including being sent as part of a header during a communication, sent upon request, or the like. Data storage can also be employed to store messages, web page content, or the like. At least a portion of the information can also be stored on another component of network computer, including, but not limited to, processor readable storage media, hard disk drive, or other computer readable storage medias (not shown) in network computer.

Data storage can include a database, text, spreadsheet, folder, file, or the like.

Data storage can further include program code, data, algorithms, and the like, for use by a processor, such as processor, to execute and perform actions. In one embodiment, at least some of data store might also be stored on another component of network computer, including, but not limited to, processor readable storage media, hard disk drive, or the like.

One or more functions of system 1 can be a single network computer or distributed across one or more distinct network computers. Moreover, system or computer is not limited to a particular configuration. Thus, in one embodiment, computer has a plurality of network computers. In another embodiment, a network server computer has a plurality of network computers that operate using a master/slave approach, where one of the plurality of network computers of network server computer is operative to manage and/or otherwise coordinate operations of the other network computers. In other embodiments, a network server computer operates as a plurality of network computers arranged in a cluster architecture, a peer-to-peer architecture, and/or even within a cloud architecture. System 1 can be implemented on a general-purpose computer under the control of a software program and configured to include the technical innovations as described herein. Alternatively, system 1 can be implemented on a network of general-purpose computers and including separate system components, each under the control of a separate software program, or on a system of interconnected parallel processors, system 1 being configured to include the technical innovations as described herein. Thus, the innovations described herein are not to be construed as being limited to a single environment, and other configurations, and architectures are also envisaged.

As described herein, embodiments of the system 1, processes and algorithms can be configured to run on a web services platform host such as Amazon Web Services (AWS), Microsoft Azure, or Google Cloud Platform. A cloud computing architecture is configured for convenient, on-demand network access to a shared pool of configurable computing resources (e.g. networks, network bandwidth, servers, processing, memory, storage, applications, virtual machines, and services). A cloud computer platform can be configured to allow a platform provider to unilaterally provision computing capabilities, such as server time and network storage, as needed automatically without requiring human interaction with the service's provider. Further, cloud computing is available over a network and accessed through standard mechanisms that promote use by heterogeneous thin or thick client platforms (e.g., mobile phones, laptops, and PDAs). In a cloud computing architecture, a platform's computing resources can be pooled to serve multiple consumers, partners or other third party users using a multi-tenant model, with different physical and virtual resources dynamically assigned and reassigned according to demand. A cloud computing architecture is also configured such that platform resources can be rapidly and elastically provisioned, in some cases automatically, to quickly scale out and rapidly released to quickly scale in.

Cloud computing systems can be configured with systems that automatically control and optimize resource use by leveraging a metering capability at some level of abstraction appropriate to the type of service (e.g., storage, processing, bandwidth, and active user accounts). Resource usage can be monitored, controlled, and reported. As described herein, in embodiments, the system 1 is advantageously configured by the platform provider with innovative algorithms and database structures for antibot challenge responses and solutions.

A Software as a Service (SaaS) platform is configured to allow a platform provider to use the provider's applications running on a cloud infrastructure. The applications are accessible from various client devices through a thin client interface such as a web browser (e.g., web-based e-mail). The consumer typically does not manage or control the underlying cloud infrastructure including network, servers, operating systems, storage, or even individual application capabilities, with the possible exception of limited user-specific application configuration settings.

A cloud computing environment is service oriented with a focus on statelessness, low coupling, modularity, and semantic interoperability. At the heart of cloud computing is an infrastructure comprising a network of interconnected nodes.

Referring now to FIG. 5 an illustrative cloud computing environment for the system 1 is depicted. As shown, cloud computing environment 1 comprises one or more cloud computing nodes 2 with which local computing devices used by cloud consumers, such as, for example, personal digital assistant (PDA) or cellular telephone 3, desktop computer 4, and laptop computer 5 data source 14, and network computer 6. Nodes 30 can communicate with one another. They can be grouped (not shown) physically or virtually, in one or more networks, such as private, community, public, or hybrid clouds as described herein, or a combination thereof. The cloud computing environment 1 is configured to offer infrastructure, platforms and/or software as services for which a cloud consumer does not need to maintain resources on a local computing device. It is understood that the types of computing devices shown in FIG. 5 are intended to be illustrative only and that computing nodes 2 and cloud computing environment 1 can communicate with any type of computerized device over any type of network and/or network addressable connection (e.g., using a web browser).

Referring now to FIG. 6, a set of functional layers provided by an example cloud computing environment 50 is shown. The components, layers, and functions shown in FIG. 6 are illustrative, and embodiments as described herein are not limited thereto. As depicted, the following layers and corresponding functions are provided:

A hardware and software layer 80 can comprise hardware and software components. Examples of hardware components include, for example: mainframes 82; servers 83; servers 84; blade servers 84; storage devices 85; and networks and networking components 86. In some embodiments, software components include network application server software 87 and database software 88.

Virtualization layer 90 provides an abstraction layer from which the following examples of virtual entities can be provided: virtual servers 91; virtual storage 92; virtual networks 93, including virtual private networks; virtual applications and operating systems 94; and virtual clients 95.

In one example, management layer 35 can provide the functions described herein. Resource provisioning 33 provides dynamic procurement of computing resources and other resources that are utilized to perform tasks within the cloud computing environment. Metering and Pricing 62 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 64 provides access to the cloud computing environment for consumers and system administrators. In an implementation, the API Gateway generates cost records that are fed into to a Cassandra based billing systems and used for billing. The gateway also generates stats that are then fed into bigquery and then in turn a ML pipeline which powers a decision support and replacement system. Service level management 37 provides cloud computing resource allocation and management so that required service levels are met. Service Level Agreement (SLA) planning and fulfillment 38 provides pre-arrangement for, and procurement of, cloud computing resources for which a future requirement is anticipated in accordance with an SLA.

Workloads layer 15 provides examples of functionality for which the cloud computing environment can be utilized. Examples of workloads and functions that can be provided from this layer comprise those described herein with respect to scraping module application programming interface (API) gateway 30, a session management server 10, a configuration manager 20, browser farm 40, logging server 50, and session analysis server 60.

Although this disclosure describes embodiments on a cloud computing platform, implementation of embodiments as described herein are not limited to a cloud computing environment.

One of ordinary skill in the art will appreciate that the architecture of system 10 is a non-limiting example that is illustrative of at least a portion of an embodiment. As such, more or less components can be employed and/or arranged differently without departing from the scope of the innovations described herein. System 1 is sufficient for disclosing at least the innovations claimed herein.

The operation of certain embodiments have described with respect to FIGS. 1A-6. In at least one of various embodiments, processes described in conjunction with FIGS. 1A-6, respectively, can be implemented by and/or executed on a single computer. In other embodiments, these processes or portions of these processes can be implemented by and/or executed on a plurality of computers. Embodiments are not limited, and various combinations of network computers, client computers, virtual machines, hardware devices or the like can be utilized.

It will be understood that each block of the flowchart illustrations, and combinations of blocks in the flowchart illustrations, can be implemented by computer program instructions. These program instructions can be provided to a processor to produce a machine, so that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the present innovations.

Accordingly, blocks of the flowchart illustration support combinations of ways for performing the specified actions, combinations of steps for performing the specified actions and program instruction means for performing the specified actions. It will also be understood that each block of the flowchart illustrations, and combinations of blocks in the flowchart illustrations can be implemented by special purpose hardware-based systems, which perform the specified actions or steps, or combinations of special purpose hardware and computer instructions. Special purpose hardware can include, but is not limited to, graphical processing units (GPUs) or AI accelerator application-specific integrated circuits. The foregoing example should not be construed as limiting and/or exhaustive, but rather, an illustrative use case to show an implementation of at least one of the various embodiments of the present innovations.

The invention claimed is:

1. A system for accessing and scraping web pages, the system comprising input and a memory including non-transitory program memory for storing at least instructions and a processor that is configured to execute instructions that cause the system to perform actions, the system comprising:
   a configuration manager for identifying and managing a website configuration for a target webpage request based on one or more webpage configuration parameters, the configuration manager being configured to generate an enriched configuration profile of a target website;
   a browser farm comprising a plurality of proxy servers configured as a browser stack configured as a web browser client, wherein the browser stack is configured to execute webpage session requests to the target website that simulate manual user requests;
   a session management server operatively connected to the browser farm, the session management server comprising:
      a session database comprising session state data to persist a website session for the target website based on the configuration parameters for the enriched configuration profile of the target website from configuration manager;
      the session management server being configured to manage webpage sessions including website access patterns that simulate manual web browsing behavior and user requests;
   a custom solver configured to deploy a bespoke webpage solution for a webpage requirement comprising a web scraping countermeasure solver;
   an application programming interface (API) gateway server operatively connected with the session management server and the configuration manager, the API gateway server being configured to obtain a browser stack configuration and a session strategy from the configuration manager for the session manager;
      the API gateway comprising a router configured to route the target webpage request to the browser farm for fetching a target webpage from the target website by one of the proxy servers based on one or more website parameters from the configuration manager, determine if the target webpage has a known configuration, and if not, route the target webpage request to the browser farm to execute the target webpage request for the browser stack and if so, route the target webpage request to the web scraping countermeasure solver; and
   a session analysis server comprising a response analyzer configured to process a response from the target website to the target webpage request to solve a web scraping countermeasure challenge from the target website and provide a web scraping countermeasure solution to the custom solver.

2. The system of claim 1 further comprising:
   a configuration manager comprising a rule manager database comprising the one or more website configuration parameters.

3. The system of claim 2 wherein the configuration parameters comprise one or more of:
   a set of ban
   rules; a session
   strategy; a set
   of selectors,
   a Javascript manager;
   Proxy Type;
   Proxy Region;
   Website Specific Scripts;
   Retry Logic;
   Domain Structure;
   Page Structure;
   Page resources;
   Website Traffic Stats;
   or a combination
   thereof.

4. The system of claim 2 wherein the configuration parameters comprise one or more of: a regional split of traffic, a bounce rate, an average pages visited, a duration, a page Search Engine Optimization (SEO) visibility, or a combination thereof.

5. The system of claim 1, further comprising:
   the browser farm comprising at least one of proxy server being configured with one or more of: a custom browser configured to prevent headless mode detection, a browser configured with patching functions, a headful browser configured for a web browser Operating System environment, a mobile device emulator, or a combination thereof.

6. The system of claim 1, the browser farm further comprising:
- the session database comprising a session cache comprising intelligent cookie and cache management to prevent poisoning and client detection,
- a policy database comprising a plurality of cache policies and request filters, and
- a custom script program comprising auto-executing scripts, including a script configured to mask a headless browser and a script to emulate real browser fingerprints.

7. The system of claim 1, wherein the session state data comprises a header, a browser profile, or a browser user directory.

8. The system of claim 1 further comprising:
- the router configured with routing parameters comprising: a locale, a time of the day, the target website traffic condition, a page type, an action to be performed on the target webpage, or a combination thereof.

9. The system of claim 1, wherein the browser farm further comprises:
- a proxy server selector configured to select a proxy server type and a region for the proxy server to fetch a geofenced targeted content from the target webpage.

10. The system of claim 1, further comprising:
- a circuit breaker configured for webpage fetching rate limits, the API gateway server being configured to determine, via a circuit breaker, whether the target website is blocked or rate limited, and
- the browser farm comprises a retry mechanism configured to execute an optimum number of retries to fetch a targeted content from the target webpage.

11. The system of claim 1, further comprising:
- a logging server configured to log target webpage request responses; and
- the response analyzer further comprising a machine intelligence engine configured to train on web page response data in a training database of logged target webpage request responses to identify patterns and anomalies and generate one or more configuration profiles for the configuration manager based on the analysis.

12. The system of claim 1, wherein the browser stack comprises a stateless browser stack, and the API gateway server is directly integrated with at least:
- a proxy scheduler;
- a policy database comprising a plurality of cache policies and request filters,
- a custom script program comprising auto-executing scripts, including a script configured to mask a headless browser and a script to emulate real browser fingerprints.

13. A computer-implemented method for accessing and scraping web pages for a system comprising and input and a memory including non-transitory program memory for storing at least instructions and a processor that is configured to execute instructions that cause the computer to perform the method comprising:
- identifying and managing a website configuration for a target webpage request based on one or more webpage configuration parameters, the configuration manager being configured to generate an enriched configuration profile of a target website;
- executing a webpage session request to the target website that simulates a manual user request with a browser stack configured as a web browser client, wherein the system comprises a browser farm comprising a plurality of proxy servers configured the as the browser stack;
- deploying a bespoke webpage solution for a webpage requirement comprising a web scraping countermeasure solver from a custom solver;
- obtaining a browser stack configuration and a session strategy from the configuration manager for a session manager with an application programming interface (API) gateway server operatively connected with a session management server and the configuration manager, the session management server being operatively connected to the session browser farm, the session management server comprising:
  - a session database comprising session state data to persist a website session for the target website based on the configuration parameters for the enriched configuration profile of the target website from configuration manager; and
  - the session management server being configured to manage webpage sessions including website access patterns that simulate manual web browsing behavior and user requests;
- routing, via a router of the API gateway, the target webpage request to a browser farm operatively connected to the session management server, the browser farm comprising a plurality of proxy servers configured the as the browser stack for fetching a target webpage from the target website by one of the proxy servers based on one or more website parameters from the configuration manager;
- determining if the target webpage has a known configuration, and if not, route the target webpage request to the browser farm to execute the target webpage request for the browser stack, and if so, route the target webpage request to the web scraping countermeasure solver; and
- processing, by a session analysis server comprising a response analyzer, a response from the target website to the target webpage request to solve a web scraping countermeasure from the target website and provide ana web scraping countermeasure solution to the custom solver.

14. The method of claim 13, wherein the browser farm further comprises:
- the session database comprising a session cache comprising intelligent cookie and cache management to prevent poisoning and client detection,
- a policy database comprising a plurality of cache policies and request filters, and
- a custom script program comprising auto-executing scripts, including a script configured to mask a headless browser and a script to emulate real browser fingerprints.

15. The system of claim 13, wherein the browser farm further comprises a proxy server selector, and the method further comprises:
- selecting, with the proxy server selector, the proxy server type and a region for the proxy server to fetch a geofenced targeted content from the target webpage.

16. The method of claim 13, wherein the browser farm further comprises: a circuit breaker configured for webpage fetching rate limits, and the method further comprises:
- determining via the API gateway server and the circuit breaker, whether the target website is blocked or rate limited, and executing a retry mechanism configured to execute an optimum number of retries to fetch a targeted content from the target webpage.

17. The method of claim 13, wherein the method further comprises:
  logging target webpage request responses at a logging server;
  training a machine intelligence engine on web page response data in a training database of the logged target webpage request responses to identify patterns and anomalies; and
  generating one or more configuration profiles for the configuration manager based on the analysis.

18. The method of claim 13, wherein the browser stack comprises a stateless browser stack, and the API gateway server is directly integrated with at least:
  a proxy scheduler;
  a policy database comprising a plurality of cache policies and request filters, and
  a custom script program comprising auto-executing scripts, including a script configured to mask a headless browser and a script to emulate real browser fingerprints.

* * * * *